(12) United States Patent
Xu et al.

(10) Patent No.: US 8,600,441 B2
(45) Date of Patent: Dec. 3, 2013

(54) TRANSPARENT RELAY USING DUAL-LAYER BEAM FORMING ASSOCIATION PROCEDURES

(75) Inventors: Hua Xu, Ottawa (CA); Zhijun Cai, Euless, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 656 days.

(21) Appl. No.: 12/819,922

(22) Filed: Jun. 21, 2010

(65) Prior Publication Data

US 2010/0323612 A1 Dec. 23, 2010

Related U.S. Application Data

(60) Provisional application No. 61/218,600, filed on Jun. 19, 2009.

(51) Int. Cl.
*H04W 88/08* (2009.01)
*H04B 7/204* (2006.01)
*H04B 7/10* (2006.01)

(52) U.S. Cl.
USPC ............. 455/562.1; 455/25; 455/561; 455/17

(58) Field of Classification Search
None
See application file for complete search history.

(56) References Cited

PUBLICATIONS

PCT International Search Report; PCT Application No. PCT/US2010/039367; Oct. 28, 2010; 5 pgs.
PCT Written Opinion of the International Searching Authority; PCT Application No. PCT/US2010/039367; Oct. 28, 2010; 7 pgs.
Research in Motion UK Limited; 3GPP TSG RAN WG1 Meeting #58; Title: Configurations of Transparent Relay Using Rel-9 Dual-Layer Beamforming; R1-093285; Shenzhen, China; Aug. 24-28, 2009; 7 pgs.
Catt; 3GPP TSG RAN WG1 #57; Title: Design of Type II Relay in LTE-A; R1-091991; San Francisco, USA; May 4-8, 2009; 3 pgs.
Alcatel-Lucent; 3GPP TSG RAN WG1 #57; Title: Type II Relay Considerations with the Separation of Control and Data; R1-092162; San Francisco, CA; May 4-8, 2009; 6 pgs.
ZTE; 3GPP TSG RAN1 #57; Title: Cooperation Scheme Considerations for Type II Relay; R1-091710; San Francisco, US; May 4-8, 2009; 4 pgs.
MCC Support; 3GPP TSG RAN WG1 Meeting #57bis; Title: Draft Report of 3GPP TSG RAN WG1 #57 v0.3.0; Los Angeles, USA; Jun. 29-Jul. 3, 2009; 66 pgs.
Alcatel-Lucent; 3GPP TSG-RAN WG1 #56bis; Title: Support Multi-Layer Beamforming in LTE; R1-091474; Seoul, Korea; Mar. 23-27, 2009; 3 pgs.
Soldani, David et al.; Title: Wireless Relays for Broadband Access; Radio Communication Series; IEEE Communications Magazine; Mar. 2008; pp. 58-66.

(Continued)

*Primary Examiner* — Philip Sobutka
(74) *Attorney, Agent, or Firm* — Conley Rose, P.C.; J. Robert Brown, Jr.

(57) ABSTRACT

A system and method for use in a communication system that includes at least one base station and at least one relay node (RN) for communicating with a user agent (UA), the system comprising a base station that includes a processor and an antenna assembly capable of simultaneously transmitting at least first and second layer base station beams to the UA and a relay node (RN) that includes a processor and an antenna assembly capable of simultaneously transmitting at least first and second layer RN beams to the UA, wherein the first base station beam and first RN beam superpose on each other during transmission and the second base station beam and second RN beam superpose on each other during transmission so that the RN is transparent to the UA.

28 Claims, 12 Drawing Sheets

(56) References Cited

PUBLICATIONS

3GPP TS 36.211 v8.6.0; 3rd Generation Partnership Project; Technical Specification Group Radio Access Network; Evolved Universal Terrestrial Radio Access (E-UTRA); Physical Channels and Modulation; Release 8; Mar. 2009; 83 pgs.

3GPP TS 36.212 v8.6.0; 3rd Generation Partnership Project; Technical Specification Group Radio Access Network; Evolved Universal Terrestrial Radio Access (E-UTRA); Multiplexing and Channel Coding; Release 8; Mar. 2009; 59 pgs.

3GPP TS 36.213 v8.6.0; 3rd Generation Partnership Project; Technical Specification Group Radio Access Network; Evolved Universal Terrestrial Radio Access (E-UTRA); Physical Layer Procedures; Release 8; Mar. 2009; 77 pgs.

3GPP TS 36.300 v8.8.0; 3rd Generation Partnership Project; Technical Specification Group Radio Access Network; Evolved Universal Terrestrial Radio Access (E-UTRA) and Evolved Universal Terrestrial Radio Access Netowrk (E-UTRAN); Overall Description; Stage 2; Release 8; Mar. 2009; 157 pgs.

3GPP TS 36.321 v8.5.0; 3rd Generation Partnership Project; Technical Specification Group Radio Access Network; Evolved Universal Terrestrial Radio Access (E-UTRA); Medium Access Control (MAC) Protocol Specification; Release 8; Mar. 2009; 46 pgs.

3GPP TS 36.331 v8.5.0; 3rd Generation Partnership Project; Technical Specification Group Radio Access Network; Evolved Universal Terrestrial Radio Access (E-UTRA); Radio Resource Control (RRC); Protocol Specification; Release 8; Mar. 2009; 204 pgs.

3GPP TR 36.814 v0.4.1; 3rd Generation Partnership Project; Technical Specification Group Radio Access Network; Further Advancements for E-UTRA; Physical Layer Aspects; Release 9; Feb. 2009; 31 pgs.

TRANSPARENT RELAY USING DUAL-LAYER BEAM FORMING ASSOCIATION PROCEDURES

CROSS-REFERENCE TO RELATED APPLICATIONS

The present application claims priority to U.S. provisional patent application No. 61/218,600 filed Jun. 19, 2009, by Hua Xu, et al, entitled "Transparent Relay Using Dual-Layer Beam Forming Association Procedures" (35757-US-PRV—4214-28300), which is incorporated by reference herein as if reproduced in its entirety.

BACKGROUND

The present invention relates generally to data transmission in mobile communication systems and more specifically to methods and systems for facilitating transparent wireless relay using dual layer beam forming procedures.

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the phrase "base station" will refer to any component, such as a traditional base station or an LTE or LTE-A base station (including eNBs), that can provide a UA with access to other components in a telecommunications system.

In mobile communication systems such as the E-UTRAN, a base station provides radio access to one or more UAs. The base station comprises a packet scheduler for dynamically scheduling downlink traffic data packet transmissions and allocating uplink traffic data packet transmission resources among all the UAs communicating with the base station. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a control channel.

It is desirable to provide high data rate coverage for UAs serviced by a base station. Typically, only those UAs that are physically close to a base station can operate with a very high data rate, and to provide high data rate coverage over a large geographical area a large number of base stations are required. As the cost of implementing such a system can be prohibitive, research is being conducted on alternative techniques to provide wide area, high data rate service.

One promising technique for increasing rate coverage is to use relay nodes (RNs) to distribute data more evenly in a cell served by a particular base station. In general, an RN can be employed to increase signal strength within a cell when a poor direct link between a UA and a base station occurs. Among different types of relays, a transparent or type II relay is particularly useful because it is simple to implement and has a relatively low cost. A transparent relay employs RNs that do not have their own cell IDs and, in at least some cases, do not have their own sync channels and control channels. The transparent relay mainly helps an associated base station transmit data and the RN is transparent in the sense that a UA cannot distinguish if a received transmission is from a base station or an RN (i.e., the UA is unaware of the existence of the RN).

One approach to relay design is to have a relay help with only data re-transmissions. In such a system, the base station initially transmits data to the UA. If the initial transmission fails, one or multiple RNs help retransmit the data by transmitting the re-transmission signal to the UA at the same time as and using the same resources as the base station. The signals transmitted by the RN and the base station combine (i.e., superpose) in the air to provide a stronger signal and thus increase the chance of re-transmission success. In other systems, in addition to being used to help with re-transmission, RNs are also used to help with initial transmissions.

One other technique for increasing rate coverage is to use directional beams to transmit information from a base station or an RN to a UA under certain circumstances. To this end, by transmitting a beam toward a UA as opposed to generally broadcasting data, the strength of the transmitted signal can be increased appreciably. Stronger signals are easier for a UA to successfully receive. Base stations can typically communicate via various communication modes including broadcast modes and at least one directional beam forming mode (e.g., LTE Rel-8 transmission mode 7) and the mode used can be dynamically modified as a function of channel quality signal strength, etc.

A communication system may support various reference signals for the downlink and uplink to facilitate beamforming and other functions such as determining which of the several different communication modes should be used to communicate with a UA. A reference signal is a signal generated based on known data and may also be referred to as a pilot, preamble, training sequences, sounding reference signal, etc. A reference signal may be used by a receiver for various purposes such as channel estimation, coherent demodulation, channel quality measurement, signal strength measurement, etc. Exemplary reference signals include a cell-specific or common reference signal (CRS) that is sent by a base station to UAs within a cell and is used for channel estimating and channel quality measurement, a UA-specific or dedicated reference signal (DRS) that is sent by a base station to a specific UA within a cell which is used for demodulation of a downlink transmission, a sounding reference signal (SRS) sent by a UA and used by a base station for channel estimation and channel quality measurement and a demodulation reference signal sent by a UA and used by a base station for demodulation of an uplink transmission from the UA.

As the physical channels experienced by signals from RN(s) and the base station are different, separate reference signals (RS) may need to be transmitted from the base station and each relay. There are two options of RS transmission from a RN including the CRS and the DRS. To reduce interference with other UAs using CRS, in at least some cases, DRS is used for transparent relay.

Current LTE devices (e.g., Rel-8 devices) may use a single-layer beamforming (BF) mode (e.g., transmission mode 7) for scheduling UAs that need relay help. Here, for example, when an initial transmission fails, the RN helps with single layer beam forming re-transmission. However empirical evidence has shown that transparent single-layer BF modes, in some cases, may not bring much improvement in sector and cell edge throughput.

Another solution for increasing sector and cell edge throughput that is being considered for next generation LTE devices is dual-layer BF. In dual-layer systems, instead of forming a single beam for transmitting data to a UA, a base station generates first and second separate beams where each of the beams transmits different streams of data. In theory, by using two streams instead of one, the throughput to a UA should be increased appreciably. Currently there is no transmission scheme to support a dual-layer BF relay system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
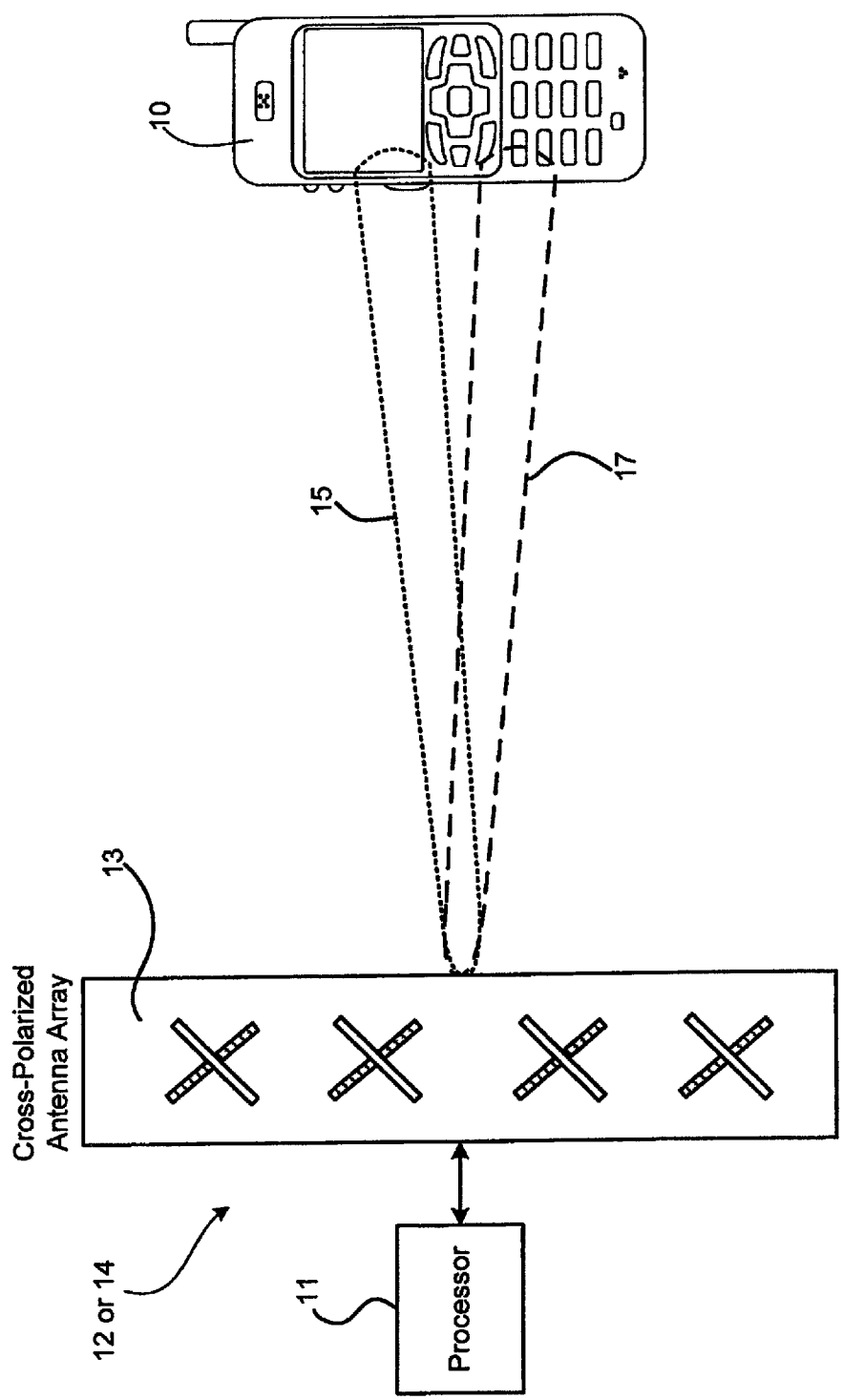
FIG. 1 is a schematic diagram illustrating a dual layer beam forming system generating two beams transmitted to a user agent.

Some embodiments include a system for use in a communication system that includes at least one base station and at least one relay node (RN) for communicating with a user agent (UA), the system comprising a base station that includes a processor and an antenna assembly capable of simultaneously transmitting at least first and second layer base station beams to the UA and a relay node (RN) that includes a processor and an antenna assembly capable of simultaneously transmitting at least first and second layer RN beams to the UA, wherein the first base station beam and first RN beam superpose on each other during transmission and the second base station beam and second RN beam superpose on each other during transmission.

In some cases the base station transmits data via resource blocks in the first and second layer base station beams and the RN transmits data via resource blocks in the first and second layer RN beams where each resource block includes resource elements and wherein at least a subset of the resource elements in each resource block transmitted by the base station include reference signals. In some cases the reference signals in the resource blocks transmitted in the first layer base station beam are orthogonal to the reference signals in the resource blocks transmitted in the second layer base station beam.

In some cases at least a subset of the resource elements in the resource blocks transmitted by the base station are common reference signals (CRS). In some cases at least a subset of the resource elements in the resource blocks transmitted by the base station are UA dedicated reference signals (DRS).

In some cases at least a subset of the resource elements in the resource blocks transmitted by the RN are DRS. In some cases the DRS in resource blocks transmitted in the first layer base station beam and the first layer RN beam superpose in the air and wherein the DRS in resource blocks transmitted in the second layer base station beam and the second layer RN beam superpose in the air.

In some cases the DRS in the resource blocks transmitted in the first layer RN beam are orthogonal to the DRS in the resource blocks transmitted in the second layer RN beam. In some cases only UA dedicated reference signals (DRS) are included in the resource blocks transmitted by the RN.

In some cases both UA dedicated reference signals (DRS) and common reference signals (CRS) are included in the resource blocks transmitted by the RN. In some cases the RN transmits the first and second layer RN beams during re-transmission by the base station.

In some cases the RN also transmits the first and second layer RN beams during initial transmissions by the base station. In some cases at least one of the RN and the base station receive signals from the UA and determine that the UA is proximate the RN. In some cases the base station and RN may transmit any combination of the first and second base station beams and the first and second layer RN beams simultaneously, depending on channel conditions.

Some embodiments include a method for use in a communication system that includes at least one base station and at least one relay node (RN) for communicating with a user agent (UA), the method comprising the steps of simultaneously transmitting at least first and second layer base station beams from the base station to the UA and simultaneously transmitting at least first and second layer RN beams from the RN to the UA, wherein the first base station beam and first RN beam superpose on each other during transmission and the second base station beam and second RN beam superpose on each other during transmission.

In some cases the step of simultaneously transmitting at least first and second layer RN beams includes transmitting the first and second layer RN beams during re-transmission by the base station. In some embodiments the step of simultaneously transmitting at least first and second layer RN beams includes the RN also transmitting the first and second layer RN beams during initial transmissions by the base station. Some cases further include the steps of at least one of the RN and the base station receiving signals from the UA and determining that the UA is proximate the RN.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views, FIG. 1 is a schematic diagram illustrating an exemplary base station 12 or relay node (RN) that includes a processor 11 linked to a cross-polarized antenna array 13. Processor 11 is capable of encoding at least two independent data streams that are modulated and mapped to frequency resources. Array 13 includes a plurality of antenna that together can form at least two and in some cases more than two independent beams for carrying the two or more independent data streams from the device 12, 14 to a UA 10. Normally, the spacing among elements in each array 13 is quite small, at about half of the wavelength. More of such antenna arrays, which have spacing of tens of wavelengths between them, could be used together to generate more independent beams. As two layers of independent data streams could be transmitted to UA 10, it is anticipated that the sector throughput is expected to be higher than in a case that relies on single layer BF transmission. Furthermore, such system has the flexibility of supporting single user transmission as well as multiple user transmission which should further improve system throughput.

Figure 2:
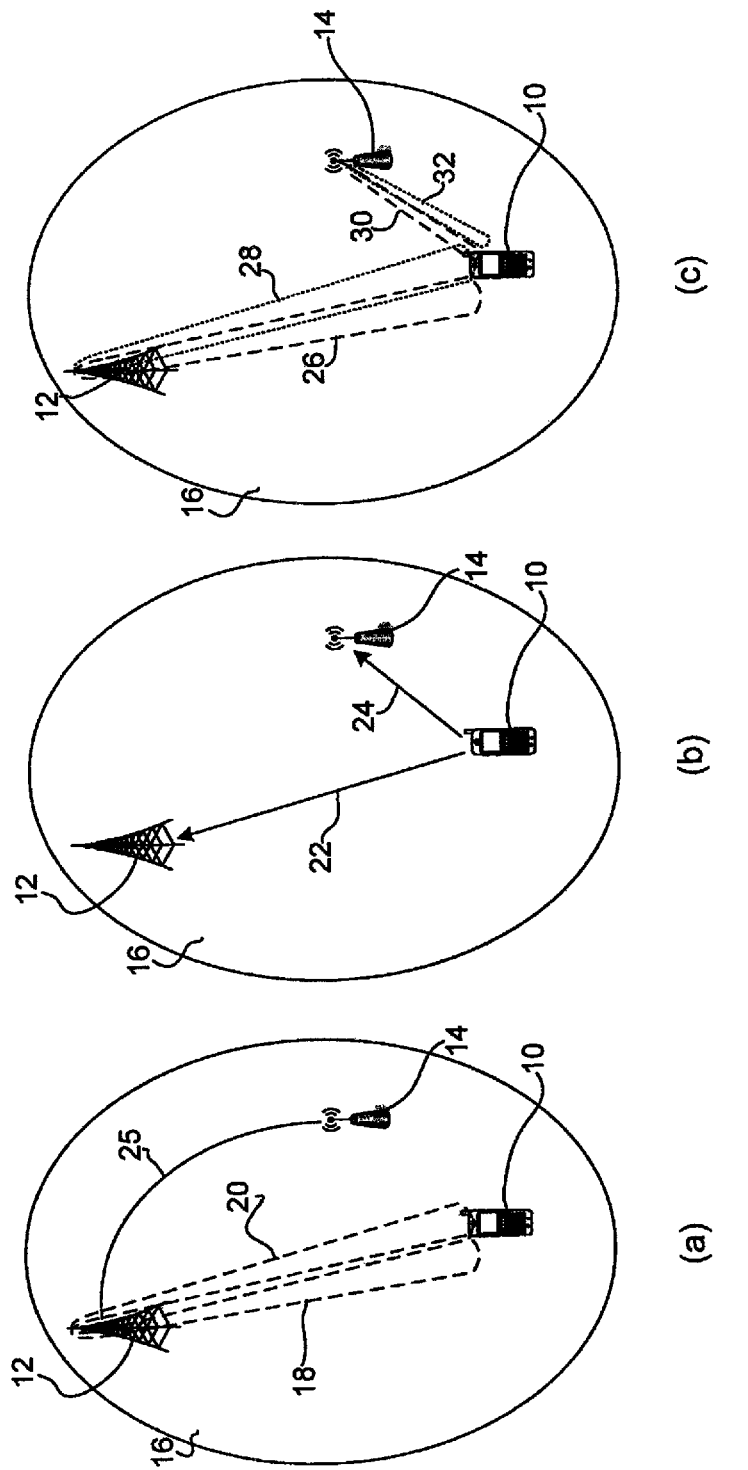
FIGS. 2(a)-2(c) illustrate steps performed in a dual layer beam forming relay system for transmitting data to a user agent.

Referring to FIG. 2(a), exemplary system components include a user agent (UA) 10, a base station 12 associated with a cell 16 and a RN 14. UA 10 includes, among other components, a processor that runs one or more software programs wherein at least one of the programs communicates with base station 12 to receive data from, and to provide data to, base station 12. When data is transmitted from UA 10 to device 12, the data is referred to as uplink data and when data is transmitted from base station 12 to UA 10, the data is referred to as downlink data. Base station 12, in one implementation, may include an E-UTRAN node B (base station 12) or other network component for communicating with UA 10.

To facilitate communications, a plurality of different communication channels are established between base station 12 and UA 10 including, among other channels, a Physical Downlink Control Channel (PDCCH) (not illustrated). As the label implies, the PDCCH is a channel that allows base station 12 to control UA 10 during downlink data communications. To this end, the PDCCH is used to transmit scheduling or control data packets referred to as Down Link Control (DCI) packets to the UA 10 to indicate scheduling to be used by UA 10 to receive downlink communication traffic packets or transmit uplink communication traffic packets or specific instructions to the UA (e.g. power control commands, an order to perform a random access procedure, or a semi-persistent scheduling activation or deactivation). A separate DCI packet may be transmitted by base station 12 to UA 10 for each traffic packet/sub-frame transmission.

Referring still to FIG. 2(a), in at least some embodiments a base station-RN backhaul link 25 is also established between station 12 and RN 14 to facilitate communication there between. Backhaul link 25 may be either wired or wireless.

Transmission Procedure

Referring again to FIG. 2(a) and also to FIGS. 2(b) and 2(c), a first exemplary transmission procedure using dual-layer BF that includes three steps is illustrated. First, as shown in FIG. 2(a), base station 12 sends an initial transmission to UA 10 using dual-layer BF (i.e., using first and second layer base station beams). Such transmission, in the illustrated embodiment, is received and decoded by RN 14 that is proximate UA 10. Second, as shown in FIG. 2(b), base station 12 and RN 14 both listen for ACK/NACK feedback 22, 24 from UA 10. Third, as shown in FIG. 2(c), if NACK is received, base station 12 and RN 14 send the re-transmission to the UA on the same resources and in the same subframe. Here, the base station sends the re-transmission via the first and second layer base station beams 26 and 28 and RN 14 sends the re-transmission via first and second layer RN beams 30 and 32, respectively. The first layer base station beam 26 and first layer RN beam 30 superimpose in the air and the second layer base station beam 28 and RN beam 32 superimpose. The second and third steps could be repeated until the re-transmission is successful.

In a second embodiment, in addition to helping with re-transmission, RN 14 may also help facilitate initial transmissions. In this case, initial transmission data may be conveyed to RN 14 through base station-RN backhaul link 25 (see again FIG. 2(a)) before the initial transmission occurs. Then, base station 12 and RN 14 may cooperatively transmit the initial transmission to UA 10 in the same subframe and using the same resources.

The first embodiment that only helps with re-transmission is useful because it does not require backhaul link bandwidth and does not incur extra latency associated with the backhaul communication prior to the initial transmission.

The second embodiment where the relay is used for transmission and re-transmission, on the other hand, helps with the initial transmission but may require more backhaul link bandwidth and additional latency. The configuration of either approach in real deployment could depend on the availability of backhaul link bandwidth, as well as the latency requirement of traffic within cell 16. In at least some embodiments base station 12 could make the above two solutions configurable and use them together to satisfy different needs and provide more choices.

Figure 3:
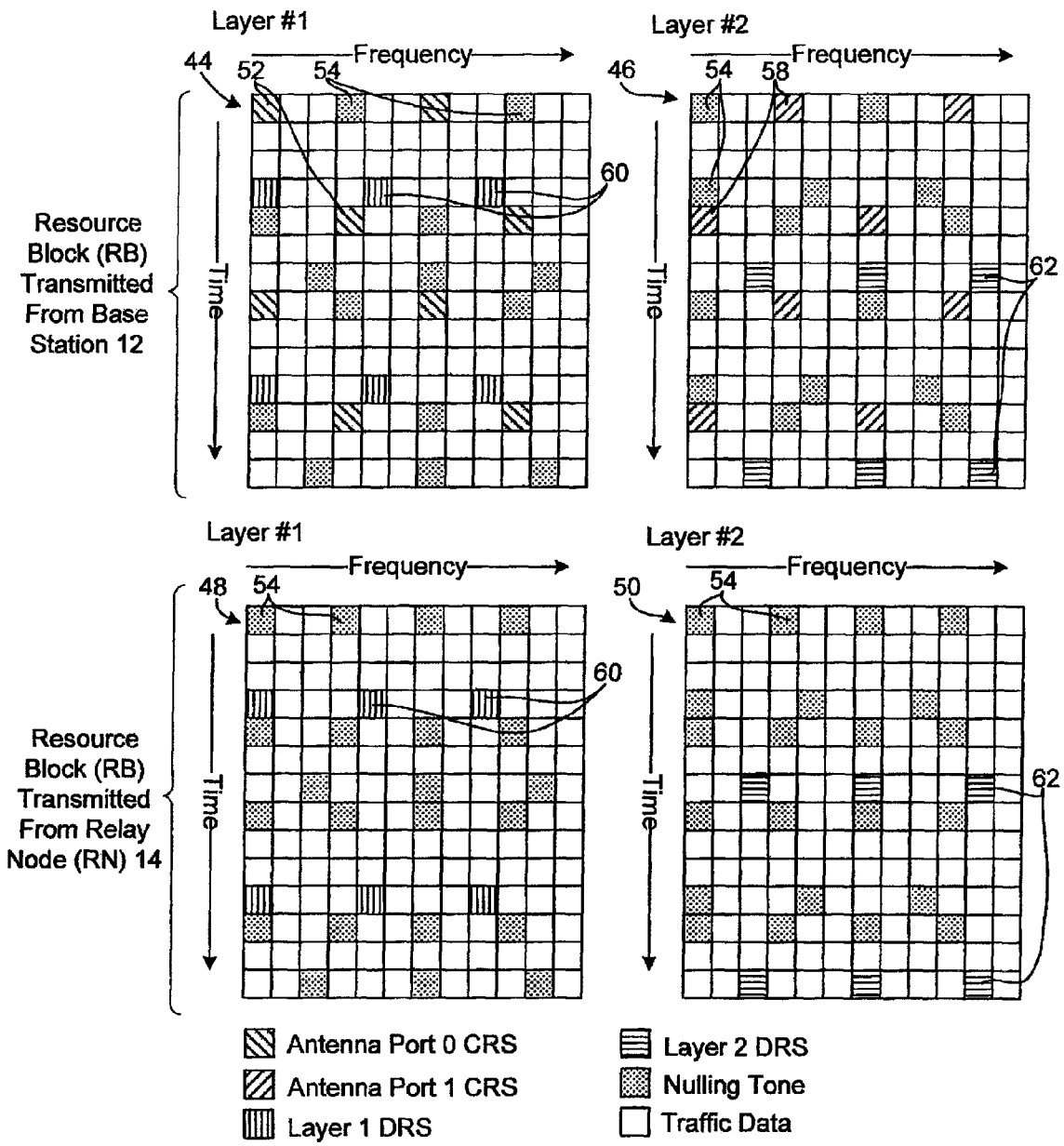
FIG. 3 is a schematic diagram illustrating dual layer resource blocks transmitted from a base station and a relay node to a user agent in a transparent relay system.

Referring to FIG. 3, resource blocks (RB) used for initial/re-transmissions from base station 12 and RN 14 in a transparent relay using dual-layer BF are illustrated. The four illustrated blocks include first and second layer blocks 44 and 46, respectively, that are transmitted from base station 12 and first and second layer blocks 48 and 50, respectively, that are transmitted by RN 14. Each block includes 168 resource elements arranged in twelve frequency columns and fourteen time rows as well known in the art. Each element corresponds to a different time/frequency combination. Each element is used to transmit either a CRS, a DRS, non-reference signal data or a null tone (e.g., no signal). Reference signals from CRS antenna port 0 are indicated by left-down-to-right cross hatching (see exemplary elements 52) and reference signals from CRS antenna port 1 are indicated by left-up-to-right cross hatching (see exemplary elements 58). Layer 1 dedicated reference signals are indicated by vertical hatching (see exemplary elements 60) while Layer 2 dedicated reference signals are indicated by horizontal hatching (see elements 62). Null tones are indicated via speckled shading (see exemplary elements 54). Non-reference signal elements during which traffic data is transmitted are blank (i.e., white).

Referring still to FIG. 3, the CRS 52, 58, etc., are routinely transmitted from base station 12 to support all UAs in a cell 16 (see again FIG. 2(a)). For UAs that need relay help, DRS 60, 62, etc., are transmitted in RB elements scheduled for demodulation. A different DRS pattern is used for each of beam layers 1 and 2 and DRS from different beams (layers) are orthogonal to each other. Here, the term "orthogonal" means that for each element in a DRS pattern on layer 1, the same element on layer 2 is null and for each element in a DRS pattern on layer 2, the same element on layer 1 is null.

FIG. 3. shows one kind of orthogonal DRS as an example, where DRS for different layers are transmitted from different time/frequency resource elements. Other forms of orthogonal DRS could also be used such as being transmitted on the same set of resource elements but being separated by different orthogonal sequences or scrambling sequences.

In operation, referring again to FIG. 2(a) and also to FIG. 3, base station 12 broadcasts blocks 44, 46 including CRS within a cell 16. When a UA 10 receives a block, the UA 10 uses the CRS to determine physical channel response, etc., and at least in a FDD system, transmits information back to the base station related thereto. Base station 12 uses the received information to perform several steps including, among others, at least in a FDD system, determining the angle of arrival of the signal from UA 10 and channel response characteristics. In a TDD system, as uplink and downlink transmit on the same frequency band, the base station may estimate such information from uplink transmission from a UA 10. Based on the channel response, base station 12 may determine that a dual layer beam mode should be employed to communicate with UA 10 and may generate DRS that are compensated at least in part as a function of the channel response. The DRS are transmitted back to UA 10 via the dual-beam layers and UA 10 uses the DRS to identify demodulation information required to demodulate subsequently received traffic data from the base station on each of the dual layers.

FIG. 3 only shows one exemplary DRS pattern. In the example, RN 14 does not transmit CRS. The main reason to not transmit CRS via RN 14 is to avoid introducing interference on the CRS so that CRS can be used by other UA for channel estimation and channel measurement.

In some embodiments, measuring composite channels from both base station 12 and RN 14 to UA 10 will let UA 10 provide more accurate channel information (e.g., Precoding Matrix Indicator (PMI) and rank). In these cases the CRS could be transmitted from RN 14 as well. For demodulation, the DRS from RN 14 would be transmitted using the same resource elements used by base station 12 which allows UA 10 to estimate the composite channel on each beam from corresponding DRS and to decode the data. As both CRS and DRS from RN 14, if transmitted, are transmitted using the same resource elements used by base station 12 to transmit CRS and DRS, the transmission from RN 14 is transparent to UA 10.

Where a dual-layer BF transmission scheme is employed, in at least some cases both base station 12 and RN 14 will be equipped with cross-polarized antenna arrays as described above with respect to FIG. 1. The number of antenna elements at RN 14 may not necessarily be the same as those at base station 12 due to the fact that a smaller coverage area is associated with RN 14.

UA Association with RN

Figure 4:
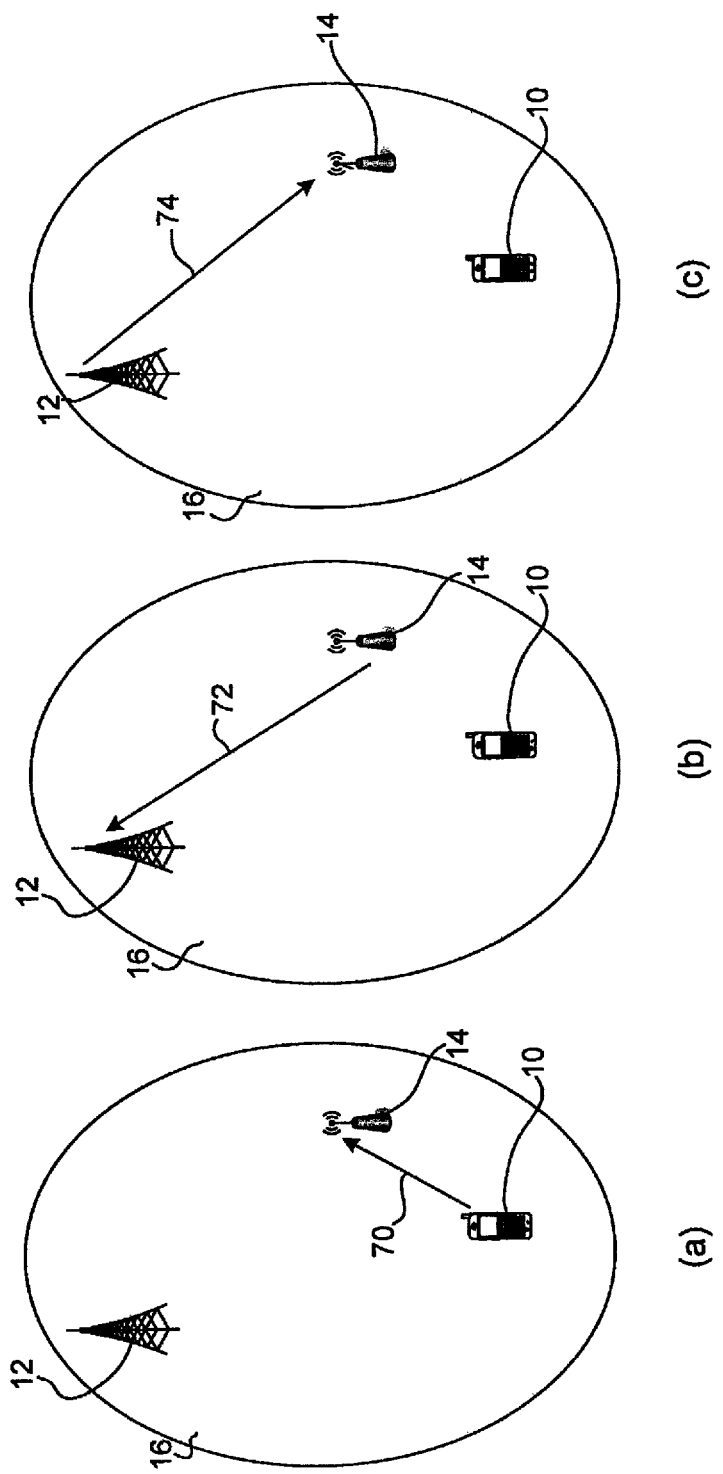
FIGS. 4(a)-4(c) illustrate method steps used by a relay node and a base station to identify user agents needing relay help.

Associations between base station 12 and RN 14 should be setup before RN 14 can help with the initial or re-transmissions in a transparent relay system. To facilitate such association, as shown in FIGS. 4(a) through 4(c), in one embodiment, the following steps are employed. Referring to FIG. 4(a), in a TDD or FDD system, RN 14 measures an uplink reference signal 70 (e.g., a sounding reference signal (SRS)) from each UA and, based on the received signal strength, identifies UAs that are proximate RN 14. In at least some embodiments the signal strength measurement may be averaged over a certain period to reduce a fast fading effect.

RN 14 sends 72 (see FIG. 4(b)) a list of UA in its neighborhood to base station 12. Base station 12 compiles a list for each RN 14 which consists of UAs nearby the RN 14 that need transmission help from the RN 14. In at least some cases the list of UAs that need help is distributed 74 (see FIG. 4(c)) to each RN 14 through base station 12 via the RN 14 backhaul link (see again 25 in FIG. 2(a)).

Upon receiving the list, RN 14 starts to listen to transmissions scheduled for UAs on the list and helps the UAs if needed. RN 14 may continue to monitor each UA on its list and report changes to base station 12. For example, if the signal from a UA becomes weak, the weak signal could imply that the UA is leaving the area served by the RN 14. Because the signal measurement is based on geometry, the updating rate of such list should be low and should not require excessive backhaul link bandwidth if UA mobility is low.

In another embodiment, the random access channel (RACH) could be used to set up RN-UA association. In this case, an RN 14 measures the signal strength of a RACH signal from a UA if no association has been established for the transmitting UA. The RN 14 passes such information to base station 12 which in turn builds an association and sends back the association information to the RN 14. After the association is established, RN 14 may be programmed to use the uplink SRS to track such association.

Beam Forming at RN

As channels and angles of arrival (AoA) between RN 14 and UA 10 could be quite different from those between base station 12 and UA 10, RN 14 must form its own transmission beams independently or jointly with assistance from base station 12. The RN-to-UA AoA may be determined in several ways as described in the following embodiments.

Figure 5:
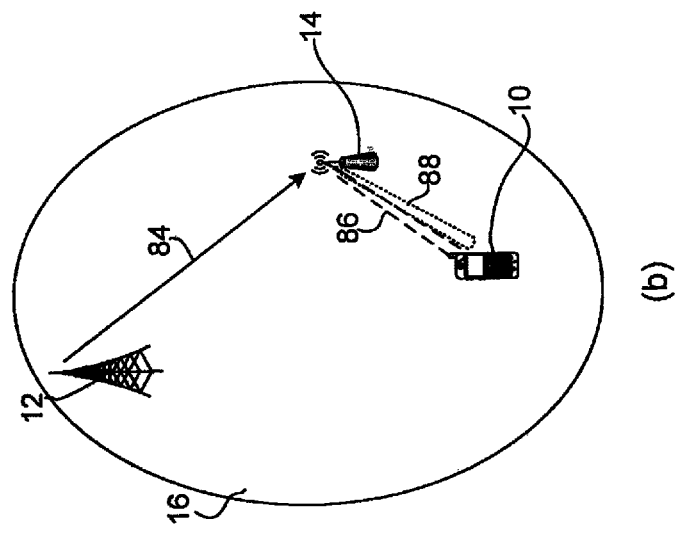
FIGS. 5(a) and 5(b) illustrate methods that may be used by a relay node form its beams in a TDD and a FDD system, respectively.
Figure 5:
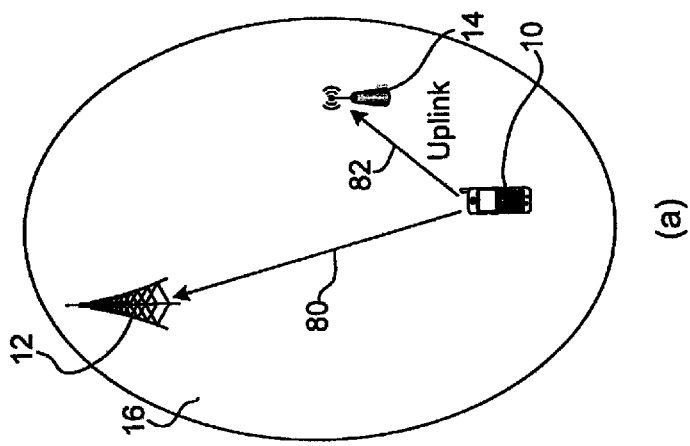

First, referring to FIG. 5(a), in a TDD system, due to channel reciprocity, RN 14 should be able to estimate AoA of UA 10 and the downlink channel from uplink SRS 80, 82 transmitted from UA 10 to form its own dual-layer beams independently. The AoA estimation will be more accurate in a neighborhood environment that is relatively less scattering and where RN 14 antenna are relatively high. In a relatively more scattering environment and with relatively low antenna, the AoA estimation could lose some precision. Nevertheless, considering that RN 14 coverage is much smaller than that of the base station 12, such estimation will often be good enough for RN 14 to form its own beams.

Second, referring to FIG. 5(b), for an FDD system, RN 14 could estimate beam weights based on AoA of UA 10 with assistance 84 from base station 12. Such assistance information (e.g., rank, PMI information feedback from the UA, etc.) can be conveyed through the backhaul base station-RN link 25 (see again FIG. 2(a)).

Third, the RN 14 beams could be jointly identified via the RN 14 and base station 12. In this case, base station 12 may act like an anchor cell and process all the feedback of channel related information from a UA, and pass relevant information to the RN 14 through the backhaul link to help RN 14 form beams.

Channel Feedback and Beam Allocation

In a dual-layer BF system, base station 12 could configure single user or multi-user transmission during each transmission. For single user transmission, one or two beams could be assigned to a single user and transmitted from one resource allocation. Base station 12 could dynamically allocate beams to a UA 10 during the transmission based on rank feedback from UA 10 or from uplink channel measurement. This is equivalent to dynamic rank adaptation in Multiple Input-Multiple Output (MIMO) transmission. For Multi-User (MU) transmission, one or two beams may be assigned to multiple users simultaneously and transmitted from the same resource allocation.

In some embodiments, to support dual-layer BF transparent relay, base station 12 may receive feedback such as a Channel Quality Indicator (CQI) and rank from a UA 10 and use that information to identify beams to use and a corresponding Modulation and Coding Scheme (MCS) for the beams. UA may measure CQI and rank based on CRS from the base station 12 to the UA if CRS is only transmitted from base station 12. In this case, base station 12 may need to adjust the CQI value in MCS assignment to account for transmission from RN 14. Such measurement could also be based on the composite channels from both base station 12 and RN 14 to UA 10, if CRS is also transmitted from RN 14. In this case, the CQI and rank information is more accurate for the base station 12 to assign beams and corresponding MCS.

In an FDD system, PMI could also be part of the feedback from UA 10, and UA 10 could determine PMI from the single channel between base station 12 to UA 10 or from the composite channel between base station 12 and RN 14 to UA 10. Such PMI would then be used to help with the beamforming at base station 12. At RN 14, in an FDD system, RN 14 may need to get the PMI and rank information to facilitate beam allocation and beam forming. Such information could be obtained by listening to UA feedback or via the base station 12 through the backhaul link 25. Such PMI and rank information would be more accurate if it is measured at the UA 10 on a composite channel.

Figure 6:
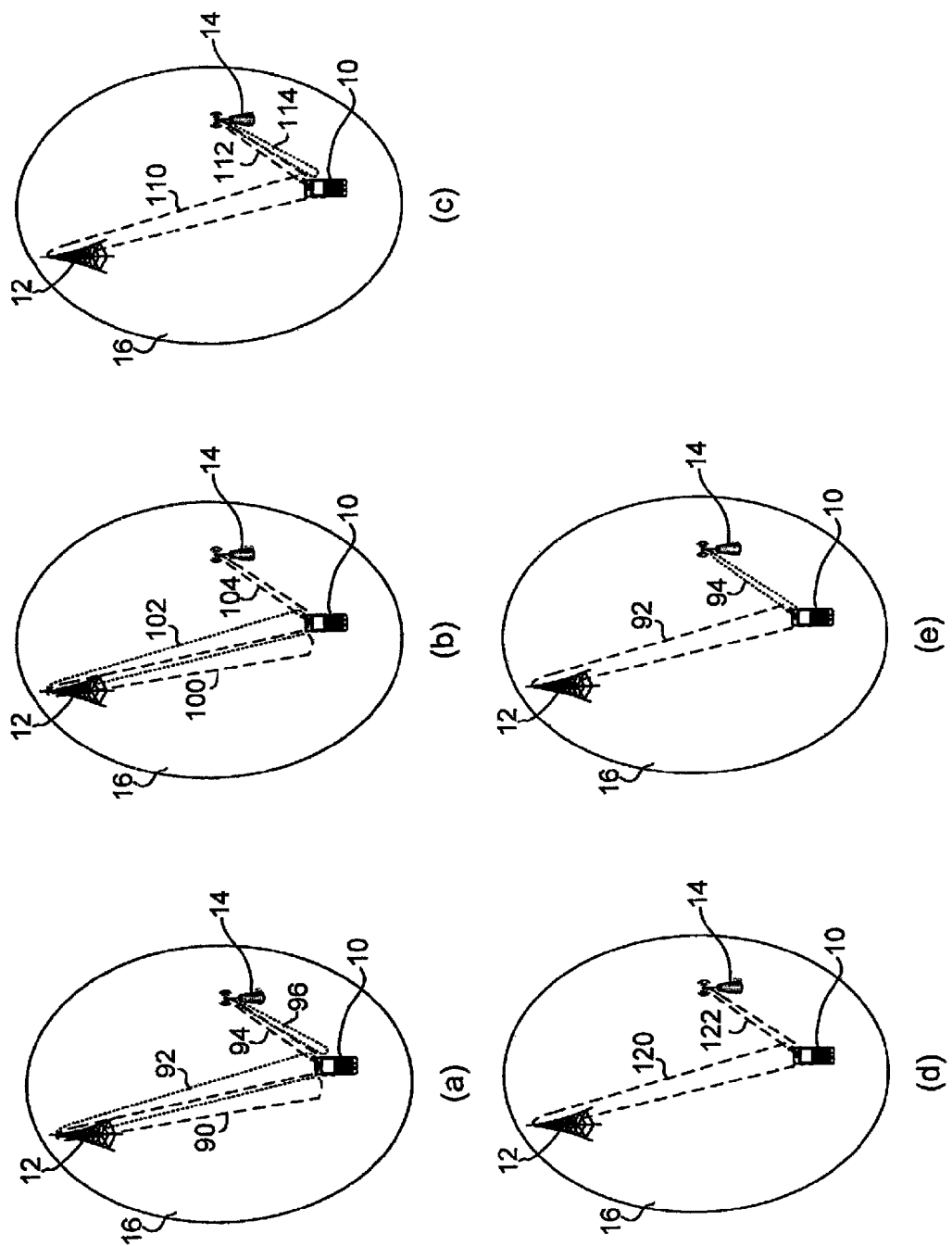
FIGS. 6(a)-6(e) illustrate various beam allocation scenarios.

Referring now to FIGS. 6(a) through 6(e), in at least some embodiments there are different scenarios for beam selections at base station 12 and RN 14 which may result in different beam allocation combinations. As shown in FIG. 6(a), during re-transmission, both base station 12 and RN 14 transmit on two beams. By transmitting on two beams from each of the base station 12 and the RN 14, signal strength on both beams during re-transmission is increased and there is an increased chance of re-transmission success.

As shown in FIG. 6(b), during re-transmission, base station 12 transmits on two beams while RN 14 only transmits on one beam. Here, base station 12 could send two beams to UA 10, however, due to the transmission environment, scheduling etc, RN 14 may only transmit on one beam to the UA 10. For example, the physical channel between RN 14 to UA 10 may only support rank-1 transmission.

As another example, an initial transmission on one beam may succeed while transmission on a second beam fails and base station 12 may schedule re-transmission on one of the beams while transmitting new data on the other beam. In this case, RN 14 may only need to transmit on one beam to help with the re-transmission. That could lead to imbalanced strength of signals on each beam as received by UA 10, which may reduce the performance gain of the relay if a simple receiver such as Minimum Mean Squared Error (MMSE) is used at UA 10. However, if a more advanced receiver such as an SIC receiver is used at UA 10, such power imbalance may benefit the performance, as the SIC receiver would be able to decode the layer with the stronger signal strength first, have it cancelled from the layer with the weaker signal and decode that layer.

As shown in FIG. 6(c), during re-transmission, base station 12 transmits on one beam while RN 14 transmits on two beams. This selection of beams may result when initial base station 12 transmissions on both beams fail and where, during re-transmission, the channel between base station 12 and UA 10 can only support rank-1 transmission. This beam selection may also result if base station 12 opts to support another UA in MU-MIMO using one of two beams. In these cases base station 12 may transmit on one beam during the re-transmission while RN 14 transmits on two beams to a single UA 10.

As shown in FIG. 6(d), both base station 12 and RN 14 transmit on the same single beam during the re-transmission. This beam selection may result when a first transmission on one beam was received successfully while transmission on the other beam fails and where base station 12 does not have new data to transmit.

As shown in FIG. 6(e), during the re-transmission, base station 12 and RN 14 transmit on different single beams. This beam selection may result where a UA 10 sends NACK for transmissions on both beams, however, during re-transmission, base station 12 cannot be transmit on one of the beams due to channel condition or other factors. For example, the channel between base station 12 and UA 10 may only support rank-1 transmission, or base station 12 may like to support another UA in MU-MIMO using a second beam. In such a situation, base station 12 could direct RN 14 to help with re-transmission on that particular beam, which is complementary to the re-transmission directly from the base station 12.

In principle, RN 14 may identify its own beams independently or RN 14 may coordinate with base station 12 in beam selections. The following embodiments illustrate several methods which could be used by RN 14 for beam selection. First, RN 14 may listen to the beam (layer) allocation in downlink PDCCH. As the switching time for RN 14 from listening to PDCCH to transmitting is very limited, this solution has certain limitation if only one radio is used by RN 14.

Second, base station 12 may inform RN 14 of beam (layer) selection through the base station-RN 14 backhaul link 25 ahead of transmission. If the relay is an inband relay, such signaling may be conveyed on the relay backhaul one sub-frame ahead of the transmission. If the relay is an outband relay, then such signaling may be conveyed just a couple of symbols ahead of the transmission.

Third, RN 14 may select beams following some pre-defined rules. For example, if a Rel-8 UA needs to be supported by the RN 14, as Rel-8 UAs only support single beam transmission, RN 14 may select one beam to transmit to such UA 10.

Fourth, an RN 14 may simply employ non-adaptive beam allocation where the RN 14 simply follows the beam allocation of the initial transmission identified via PDCCH monitoring of the initial transmission.

Fifth, RN 14 may select beams based on UA 10 feedback information or uplink SRS measurement. In addition to ACK/NACK feedback, RN 14 also listens to the rank and channel feedback information from the UA. For a TDD system, RN 14 should be able to obtain such information from uplink SRS. In the situation that base station 12 overrides the PMI feedback from a UA 10, base station 12 should inform RN 14 of the override.

Backhauling Signal

To support a transparent relay with a dual-relay BF system, signaling design needs to be considered. In cases where downlink synchronous non-adaptive HARQ is employed, RN 14 knows when the re-transmission starts and what the re-transmission attributes are. However, if downlink asynchronous adaptive HARQ is employed, RN 14 needs to know when and where the base station 12 sends the re-transmission. Such information may be obtained by decoding the PDCCH. However, as the PDCCH and the PDSCH in current Rel-8 are transmitted in the same subframe, RN 14 may not have enough time to switch from reception to transmission after decoding the PDCCH to facilitate a properly timed re-transmission.

Figure 7:
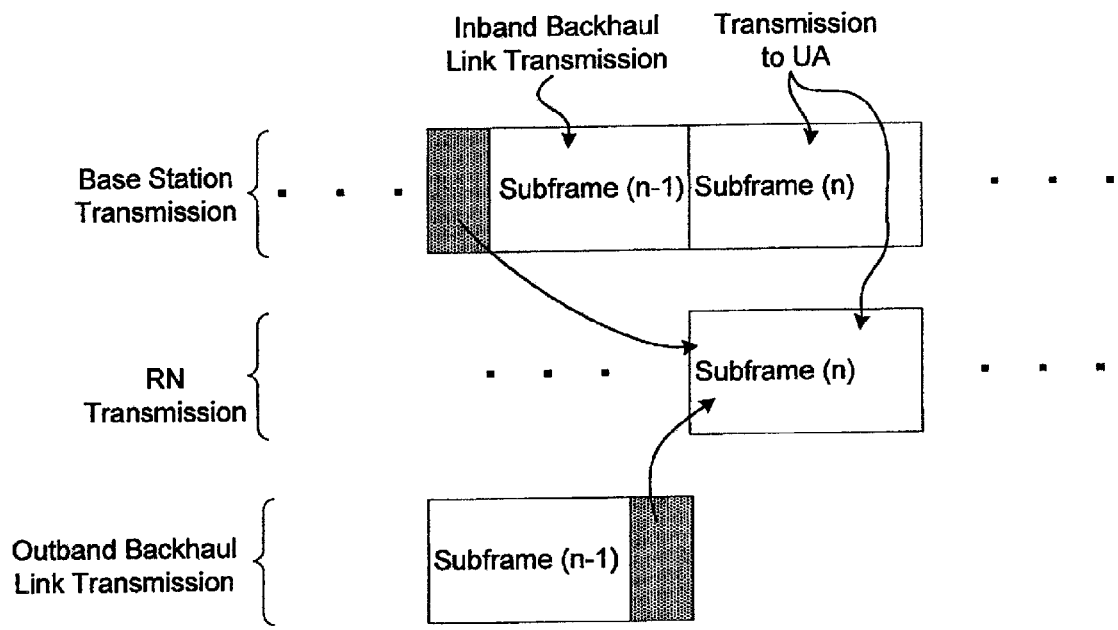
FIG. 7 is a schematic diagram illustrating in-band and out-band back-haul link transmissions that can be used to signal retransmissions to a relay node ahead of time.

In at least some embodiments a more feasible way for RN 14 to identify re-transmission attributes is for base station 12 to send re-transmission information such as subframe index, resource allocation and other re-transmission attributes to RN 14 ahead of each re-transmission. As shown in FIG. 7, such signaling may be sent through the base station-RN backhaul link 25 in both inband or outband relay. In an outband relay system, because the backhaul link uses a different band than the access band, such signaling may be sent one or two symbols ahead of the re-transmission, thus incurring very small latency. In an inband relay system, because the backhaul link and access link share the same band, such signaling may be transmitted on a backhaul link subframe one or more sub-frames ahead of the re-transmission and therefore would incur more latency.

For UAs having low geometry that need relay help, the gain from relay transmission should outweigh the scheduling gain. To reduce the overall impact on scheduling, UAs that need relay help may be grouped and scheduled together. Where UAs are grouped together, base station 12 may be able to pack all control signals for the UAs together and send them the over the backhaul link to further reduce overhead.

In at least some embodiments where a relay is only used to help with re-transmissions, very little base station-RN backhaul bandwidth may be required as only a relatively small amount of control signaling is required.

Channel Estimation

Where DRS are used in dual-layer BF, the DRS will be used to demodulate data. For transparent relay built with dual-layer BF, the re-transmissions from RN 14 and base station 12 superpose on each other in the air as do the DRS transmitted from RN 14 and base station 12 for each beam. In one embodiment, in order for the UA to estimate the composite channels from DRS, DRS transmitted by RN 14 should use the same scrambling sequence used by its donor base station 12.

Synchronization

As re-transmission signals transmitted from RN 14 and base station 12 superpose in the air, RN 14 may synchronize its transmission with base station 12 to avoid the case where the RN re-transmission falls out of sync when arriving at UA 10. The RN 14 may synchronize itself with base station 12 based on the downlink sync channel and because most RN 14 will not move or will only move slowly, such synchronization and tracking should be easily achieved. By synchronizing the RN 14 to the base station 12, RN and base station re-transmissions arriving at a UA 10 should align with each other within the cyclic prefix and thus improve the performance of the transparent relay.

Transmission Configurations

Figure 8:
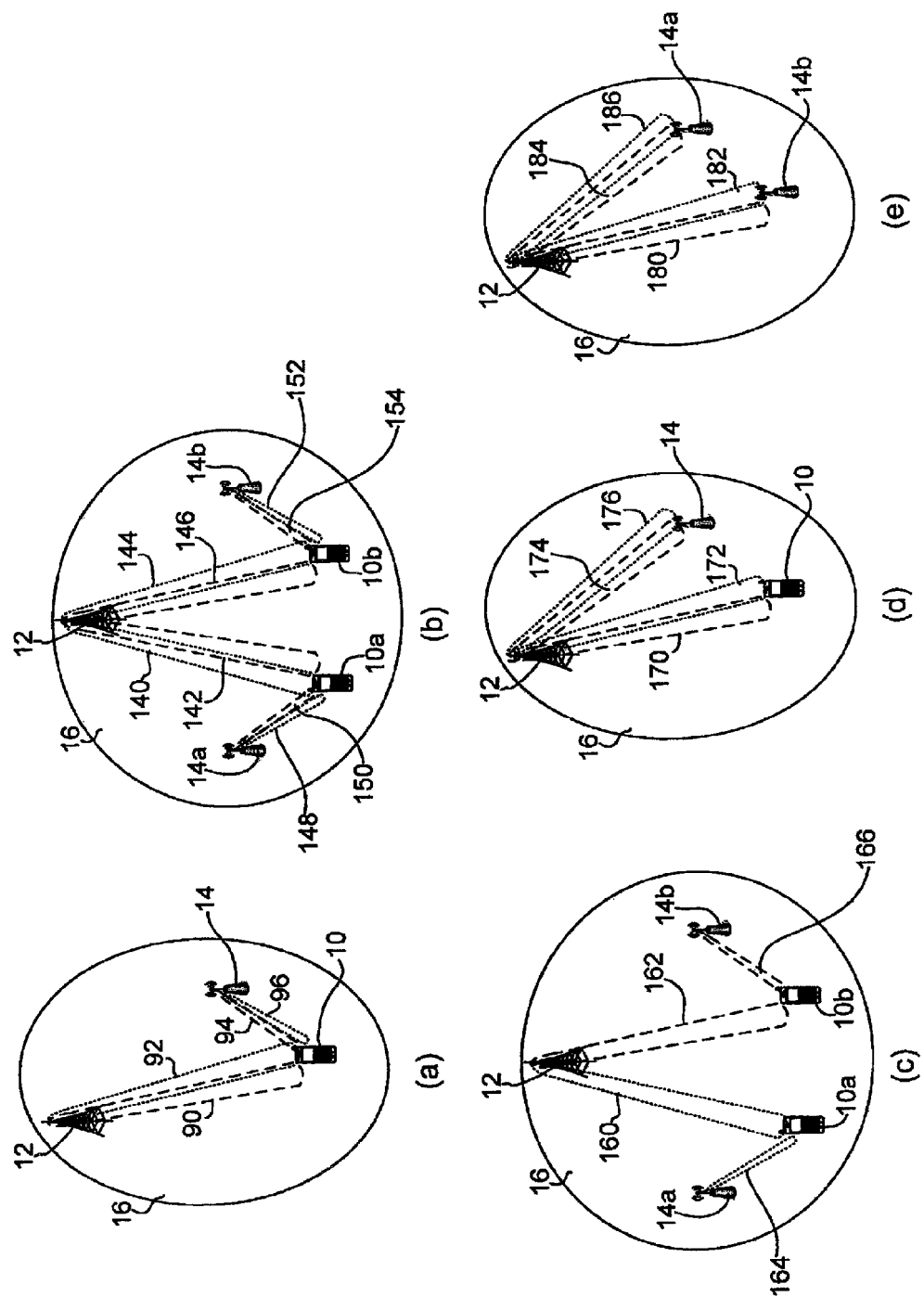
FIGS. 8(a)-8(e) illustrate different relay deployment scenarios that may be facilitated via a dual layer beam forming system.

Transparent relay using dual-layer BF may be utilized by different transmission configurations. In at least some embodiments a number of transmission configurations as illustrated in FIGS. 8(*a*) through 8(*e*) are contemplated. As shown in FIG. 8(*a*), a single user is supported and both base station 12 and RN 14 transmit to the single UA 10 simultaneously. In the illustration base station 12 transmits using dual layer beams 90 and 92 while RN 14 transmits using dual layer beams 94 and 96. In at least some cases the transmission may use single and dual beams with dynamic beam switching.

In FIG. 8(*b*), the base station 12 works with two or multiple RNs 14*a* and 14*b* and transmit to two or multiple UAs 10*a* and 10*b* simultaneously. In the illustration station 12 transmits to UA 10*a* using dual layer beams 140 and 142 and to UA 10*b* using beams 144 and 146 while RN 14*a* transmits to UA 10*a* via beams 148 and 150 and RN 14*b* transmits to UA 10*b* via beams 152 and 154. In at least some cases the transmission may use single or dual beams. To reduce the interference among transmissions between users, the AoA spacing between scheduled users at base station 12 should be relatively large for such a transmission scenario.

In FIG. 8(*c*), base station 12 may work with one or two RN 14*a* and 14*b* and transmit to two UA 10*a* and 10*b* simultaneously, but using a first beam 160 for UA 10*a* and a second different beam 162 for UA 10*b* (see also different RN beams 164 and 166). This beam selection may be used for two scheduled users whose AoA spacing at base station 12 is small. In such case, to reduce the cross-interference between users, different beams with orthogonal DRS are used to transmit to different UAs 10a and 10b.

In FIG. 8(d), base station 12 transmits to RN 14 using dual layer beams 174 and 176 and to UA 10 using dual layer beams 170 and 172 simultaneously. The beams used for transmission to RN 14 and UA 10 may be the same or different. Station 12 transmits to UA 10 as access link and to RN 14 as a relay backhaul link.

In at least some embodiments the transmission on the backhaul link may use Spatial Division Multiple Access (SDMA) technique and therefore the transmission may not have to follow the TDM multiplexing rule between backhaul link and access link as specified in LTE-A. If properly utilized, such configuration may reduce the latency on the base station-RN backhaul transmission. For example, while transmitting to one UA, the base station 12 may transmit the initial transmission scheduled to another UA to its serving RN 14. The RN 14 may then help with the initial transmission to the other UA.

In FIG. 8(e), base station 12 transmits to a first RN 14a using dual layer beams 180 and 182 and to a second RN 14b using beams 184 and 186 simultaneously. The beams used for transmission to RNs 14a and 14b may be the same or different. Such configuration may allow base station 12 to transmit to two RN at the same time using SDMA, and therefore, may increase the backhaul link capacity.

Control Signaling for Beam Index or DRS Port

Most of transmission configurations described above may be configured by base station 12. Dynamic switching between such configurations may be transparent to a UA 10. For example, the Single User (SU)-MIMO and MU-MIMO transmission configurations described above may be switched between each other, and UA 10 does not have to be informed of such switching.

One problem that may occur is that transmitting in a MU-MIMO scenario may introduce cross-beam interference on signals to each UA. Nevertheless, interference impact may be mitigated if some interference suppression techniques are used in UA receivers or if base station 12 takes this into consideration and only schedules UA for MU-MIMO whose AoA spacing at base station 12 is large enough.

One exception would come from the configuration when base station 12 and two RN 14a and 14b transmit to two UAs 10a and 10b using two different beams as described above in FIG. 8(b). For such transmission, current Rel-8 DCI which only signals the transmission rank (beam) is not enough as each UA must be informed of the particular beam it is receiving, due to the fact that the DRS on each beam is different and the DRS on dual layer beams are orthogonal to each other. In one embodiment, a transmission beam signal may be defined as shown in Table 1 in which a 2-bit bitmap is used to indicate to a UA 10 the beams transmitted. Thus, a [1 0] bitmap indicates that only beam 1 is transmitted, a [0 1] bitmap indicates that only beam 2 is transmitted and a [1 1] map indicates that both beams 1 and 2 are transmitted. There are several benefits to such signaling. First, such signaling explicitly signals to each UA the layer(s) being used for its transmission. Second, such a scheme implicitly signals the rank information to the UA for its transmission as the number of "1s" in the bitmap indicate rank. Third, this scheme not only supports both SU-MIMO or MU-MIMO configurations using one or two beams, it also supports an MU-MIMO configuration, transmitting different beams to different UAs.

TABLE 1

| Beam Index Bitmap (2 bits) | Interpretation | Rank |
| --- | --- | --- |
| [1 0] | Beam 1 transmitted | 1 |
| [0 1] | Beam 2 transmitted | 1 |
| [1 1] | Beams 1 and 2 transmitted | 2 |

In some embodiments the signaling in Table 1 may be viewed as the signaling for DRS ports as the DRS ports on each beam are orthogonal to each other and there exists a one-to-one mapping between the beam and the DRS port. In this case signaling of [1 0] indicates to the UA to use layer 1 DRS port for demodulation, signaling of [0 1] indicates to the UA to use layer 2 DRS port for demodulation, and signaling of [1 1] indicates to the UA to use both layers DRS ports for demodulation.

As dual-layer BF will be a new transmission mode, a new DCI may be defined or an existing Rel-8 DCI be reused with some modification. Among existing Rel-8 DCI formats, it seems the closest match would be format 2A. For format 2A, all the rest of signaling bits may be reused, while the 2-bits precoding field for 4 antenna ports may be replaced by the 2-bit signaling for beams or DRS ports as proposed here.

If Transport Block (TB) information in Rel-8 DCI format 2/2A is considered, then rank-2 SU-MIMO with bitmap of layers of [1 1] in Table 1 does not need to be signaled and this index could be reserved for other purposes. In this case the following steps may be used to generate signaling. If both TB are enabled, no explicit signal is needed as this implies that rank-2 SU-MIMO will be transmitted. On the other hand, if only one TB is enabled, the signaling in Table 2 may be used where "x" in the table indicates layers not transmitted.

TABLE 2

| Index | Bitmap Indication of Layer | Rank | Mode |
| --- | --- | --- | --- |
| 0 | [1 x] | 1 | SU-MIMO |
| 1 | [1 0] | 2 | MU-MIMO |
| 2 | [0 1] | 2 | MU-MIMO |
| 3 | | Reserved | |

Here, only the index in the leftmost column in Table 2 will be signaled to the UA, which requires 2-bit. Such signaling indicates the transmit layers, the total transmission rank and SU-MIMO or MU-MIMO mode.

The proposed signaling would make all transmission configurations for transparent relay using dual-layer BF transparent to the UA for different transmission configurations, which is highly desired.

Figure 9:
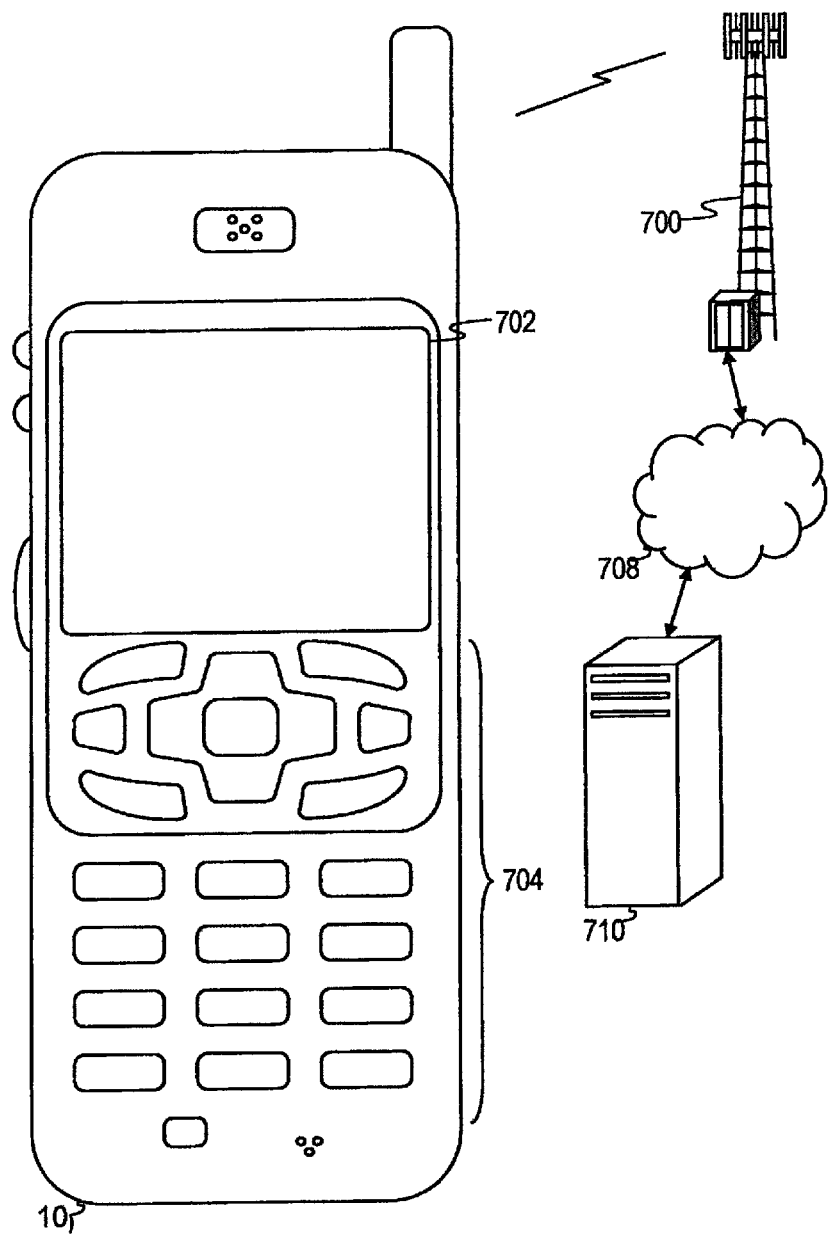
FIG. 9 is a diagram of a wireless communications system including a UA operable for some of the various embodiments of the disclosure.

FIG. 9 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 10:
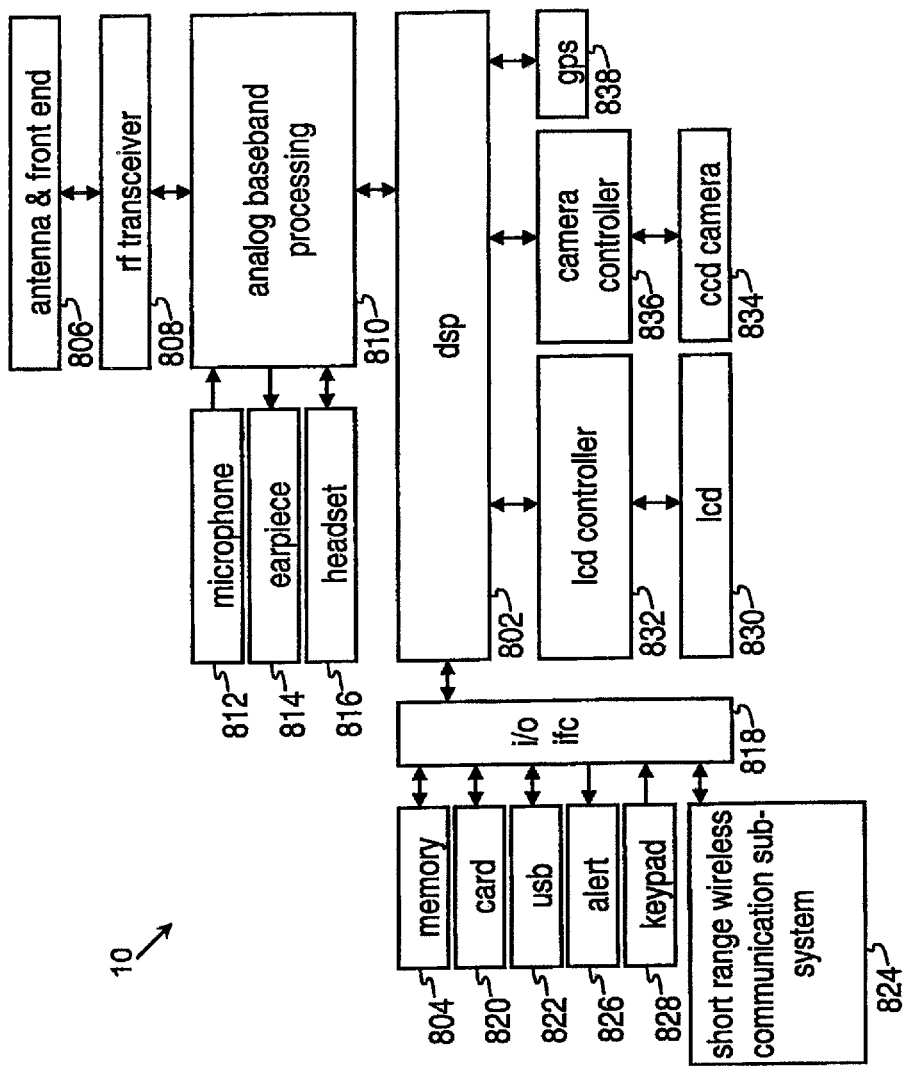
FIG. 10 is a block diagram of a UA operable for some of the various embodiments of the disclosure.

FIG. 10 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UA 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 11:
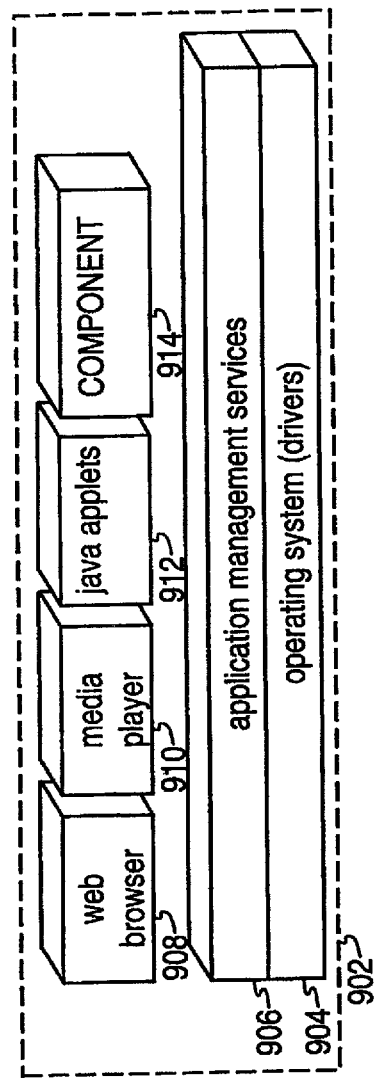
FIG. 11 is a diagram of a software environment that may be implemented on a UA operable for some of the various embodiments of the disclosure.

FIG. 11 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 11 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 12:
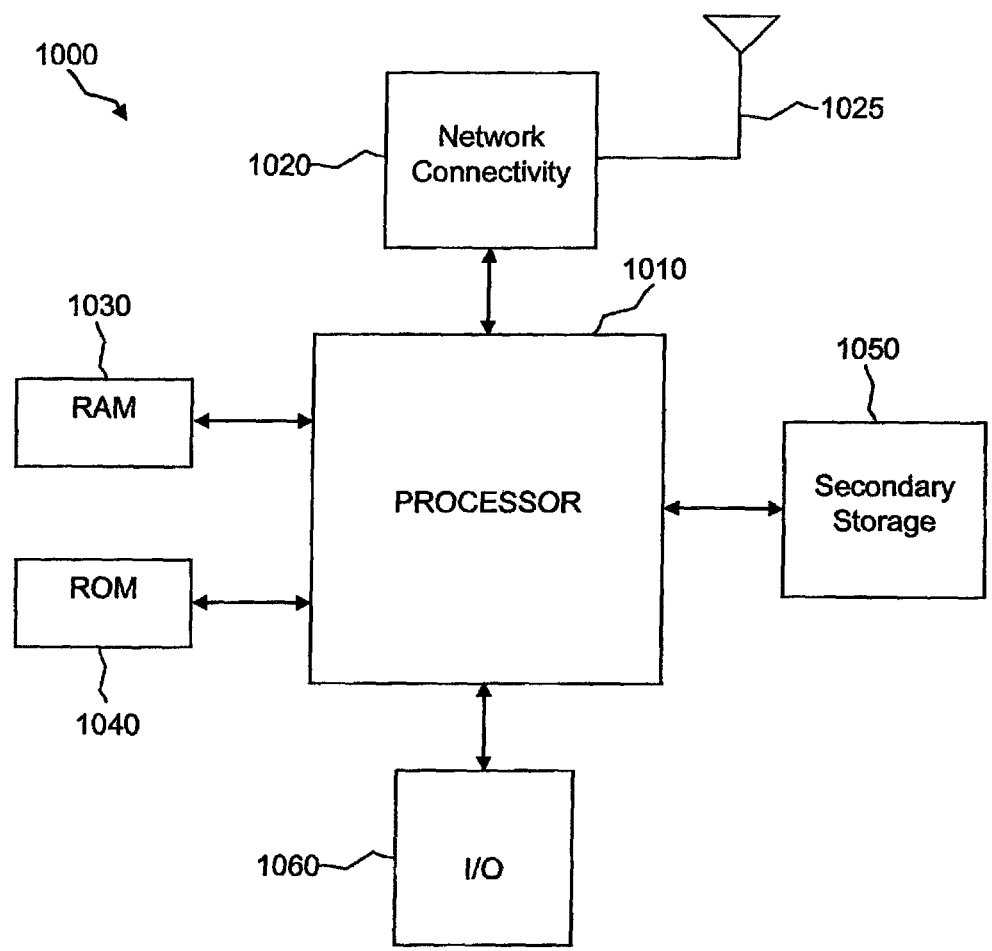
FIG. 12 is an illustrative general purpose computer system suitable for some of the various embodiments of the disclosure.

The UA 10, base station 12, and other components described above might include a processing component that is capable of executing instructions related to the actions described above. FIG. 12 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.814, TS 36.321, TS 36.331, and TS 36.300, TS 36.211, TS 36.212 and TS 36.213.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

1. A system for use in a communication system that includes at least one base station and at least one relay node (RN) for communicating with a user agent (UA), the system comprising:
    a base station that includes a processor and an antenna assembly capable of simultaneously transmitting at least first and second layer base station beams to the UA; and
    a relay node (RN) that includes a processor and an antenna assembly capable of simultaneously transmitting at least first and second layer RN beams to the UA;
    wherein the first base station beam and first RN beam superpose on each other during transmission and the second base station beam and second RN beam superpose on each other during transmission.

2. The system of claim 1 wherein the base station transmits data via resource blocks in at least the first and second layer base station beams and the RN transmits data via resource blocks in at least the first and second layer RN beams where each resource block includes resource elements and wherein at least a subset of the resource elements in each resource block transmitted by the base station include reference signals.

3. The system of claim 2 wherein reference signals in the resource blocks transmitted in the first layer base station beam are orthogonal to the reference signals in the resource blocks transmitted in at least the second layer base station beam.

4. The system of claim 3 wherein at least a subset of the resource elements in the resource blocks transmitted by the base station are common reference signals (CRS).

5. The system of claim 4 wherein at least a subset of the resource elements in the resource blocks transmitted by the base station are UA dedicated reference signals (DRS).

6. The system of claim 5 wherein at least a subset of the resource elements in the resource blocks transmitted by the RN are DRS.

7. The system of claim 6 wherein the DRS in resource blocks transmitted in the first layer base station beam and the first layer RN beam superpose in the air and wherein the DRS in resource blocks transmitted in the second layer base station beam and the second layer RN beam superpose in the air.

8. The system of claim 5 wherein the DRS in the resource blocks transmitted in the first layer RN beam are orthogonal to the DRS in the resource blocks transmitted in at least the second layer RN beam.

9. The system of claim 2 wherein only UA dedicated reference signals (DRS) are included in the resource blocks transmitted by the RN.

10. The system of claim 2 wherein both UA dedicated reference signals (DRS) and common reference signals (CRS) are included in the resource blocks transmitted by the RN.

11. The system of claim 1 wherein the RN transmits the first and second layer RN beams during re-transmission by the base station.

12. The system of claim 11 wherein the RN also transmits the first and second layer RN beams during initial transmissions by the base station.

13. The system of claim 1 wherein at least one of the RN and the base station receive signals from the UA and determine that the UA is proximate the RN.

14. The system of claim 1 wherein the base station and RN may transmit any combination of the first and second base station beams and the first and second layer RN beams simultaneously, depending on channel conditions.

15. A method for use in a communication system that includes at least one base station and at least one relay node (RN) for communicating with a user agent (UA), the method comprising the steps of:
- simultaneously transmitting at least first and second layer base station beams from the base station to the UA; and
- simultaneously transmitting at least first and second layer RN beams from the RN to the UA;
- wherein the first base station beam and first RN beam superpose on each other during transmission and the second base station beam and second RN beam superpose on each other during transmission.

16. The method of claim 15 wherein the base station transmits data via resource blocks in at least the first and second layer base station beams and the RN transmits data via resource blocks in at least the first and second layer RN beams where each resource block includes resource elements and wherein at least a subset of the resource elements in each resource block transmitted by the base station include reference signals.

17. The method of claim 16 wherein reference signals in the resource blocks transmitted in the first layer base station beam are orthogonal to the reference signals in the resource blocks transmitted in at least the second layer base station beam.

18. The method of claim 17 wherein at least a subset of the resource elements in the resource blocks transmitted by the base station are common reference signals (CRS).

19. The method of claim 18 wherein at least a subset of the resource elements in the resource blocks transmitted by the base station are UA dedicated reference signals (DRS).

20. The method of claim 19 wherein at least a subset of the resource elements in the resource blocks transmitted by the RN are DRS.

21. The method of claim 20 wherein the DRS in resource blocks transmitted in the first layer base station beam and the first layer RN beam superpose in the air and wherein the DRS in resource blocks transmitted in the second layer base station beam and the second layer RN beam superpose in the air.

22. The method of claim 19 wherein the DRS in the resource blocks transmitted in the first layer RN beam are orthogonal to the DRS in the resource blocks transmitted in at least the second layer RN beam.

23. The method of claim 16 wherein only UA dedicated reference signals (DRS) are included in the resource blocks transmitted by the RN.

24. The method of claim 16 wherein both UA dedicated reference signals (DRS) and common reference signals (CRS) are included in the resource blocks transmitted by the RN.

25. The method of claim 15 wherein the step of simultaneously transmitting at least first and second layer RN beams includes transmitting the first and second layer RN beams during re-transmission by the base station.

26. The method of claim 25 wherein the step of simultaneously transmitting at least first and second layer RN beams includes the RN also transmitting the first and second layer RN beams during initial transmissions by the base station.

27. The method of claim 15 further including the steps of at least one of the RN and the base station receiving signals from the UA and determining that the UA is proximate the RN.

28. The method of claim 15 wherein the base station and RN may transmit any combination of the first and second base station beams and the first and second layer RN beams simultaneously, depending on channel conditions.

* * * * *